March 22, 1955     A. M. MacFARLAND     2,704,780

LEAKPROOF DRY CELL

Filed Aug. 31, 1950

INVENTOR.
ALLISON M. MacFARLAND
BY Bosworth + Sessions
ATTORNEYS.

United States Patent Office 2,704,780
Patented Mar. 22, 1955

2,704,780
LEAKPROOF DRY CELL

Allison M. MacFarland, Cleveland, Ohio, assignor to General Dry Batteries, Inc., Lakewood, Ohio, a corporation of Ohio Application August 31, 1950, Serial No. 182,607

13 Claims. (Cl. 136—107)

This invention relates to dry cells and more particularly to dry cells of the type used in flashlights.

It is well known that difficulties are encountered in the use of ordinary dry cells of the Leclanché type because of swelling of the cells and leakage of electrolyte. With dry cells of conventional construction leakage of the electrolyte may corrode or otherwise damage the casing of the flashlight or other device in which the cells are used and the cells may swell to such an extent as to make it impossible to remove them from the casing.

A general object of the present invention, therefore, is to provide a dry cell in which the difficulties due to swelling and leakage are eliminated. Another object is to provide a substantially leakproof dry cell which can be manufactured at reasonable cost. A further object is the provision of an efficient and economical method of manufacturing such cells.

Figure 1:
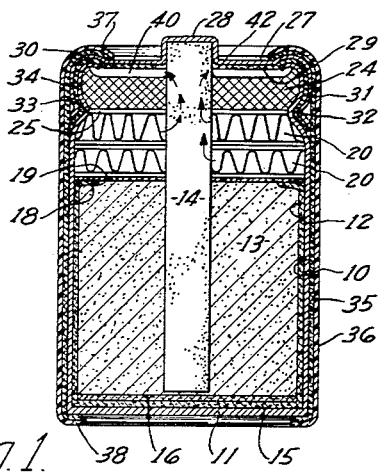
Figure 2:
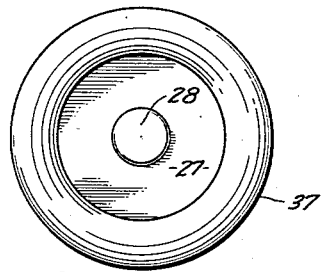
Figure 3:
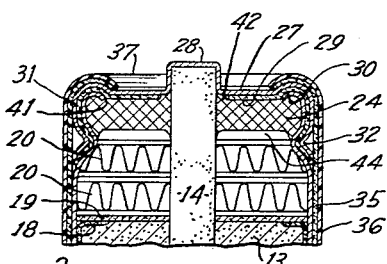
Figure 4:
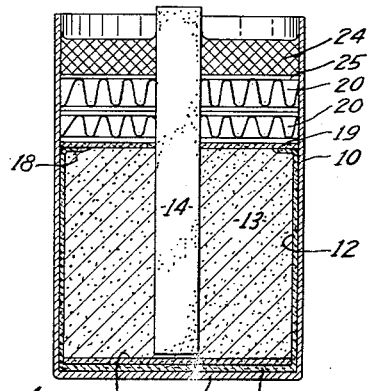
Figure 5:
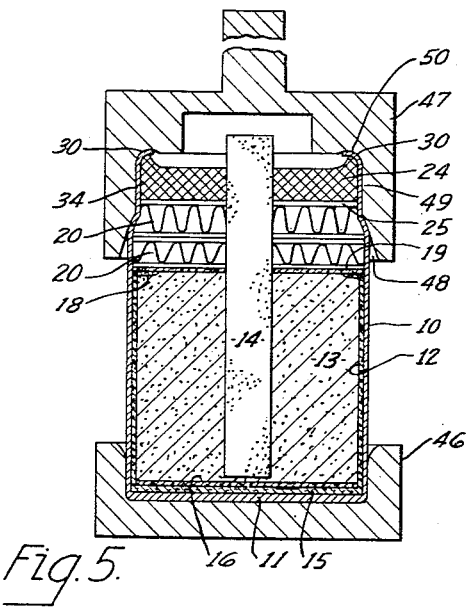
Figure 6:
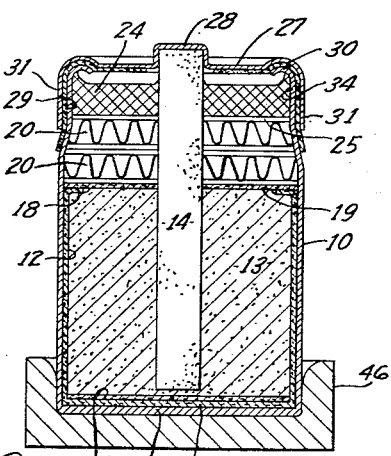

Other objects and advantages of the invention will become apparent from the following description of a preferred form of the invention, reference being made to the accompanying drawings wherein Figure 1 is a vertical cross sectional view of a preferred form of flashlight cell embodying the invention, showing the cell as it appears before it has been placed in service; Figure 2 is a plan view of the cell of Figure 1; Figure 3 is a sectional view of the upper portion of the cell of Figure 1 showing the cell as it appears after it has been in service for a period of time; and Figures 4, 5 and 6 are vertical sectional views illustrating steps in a preferred method of manufacturing the cell shown in Figure 1.

The production of leakproof or leak resistant dry cells is complicated by the fact that in order to prevent the building up of destructive pressures within the cells, it is necessary to provide some means for venting the gas that is generated in the operation of the cells; yet, at the same time, admission of air to the interior of the cell and leakage of electrolyte therefrom must be prevented. Furthermore, space for expansion of the materials of the cell must be provided, but this space should be kept as small as possible in order to minimize the amount of air contained in the interior of the cell and also to provide room for as large a quantity of active materials in the cell as possible.

According to the present invention these requirements are met by the provision of a cell embodying a seal composed of a material such as asphalt, wax or pitch that remains soft or plastic at ordinary temperatures; the seal is arranged so as to permit gas to escape from the cell during the early activity of the cell but moves to block further escape of gas and the escape of liquid after the cell has been in service and in so moving gives an increased expansion space for the materials within the cell without admitting additional air to the interior of the cell. According to the preferred method of manufacture the sealing material is poured into place while hot in the end of the zinc cup which constitutes one electrode of the cell; after the seal has cooled, it is consolidated and raised to the desired initial position by reducing the diameter of the zinc cup in the region where the seal is located.

Referring now to Figures 1 and 2 of the drawings, a preferred form of seal embodying my invention comprises a container 10 consisting of a drawn zinc cup circular in cross section, open at its upper end and having a bottom wall 11. The bottom 11 is preferably heavier than the side walls of the cup, and is of sufficient thickness substantially to eliminate the possibility of perforation thereof by the chemical action which takes place within the cell. The zinc cup, which constitutes one elecrode of the cell, has the usual cell components therein, these being the electrolyte-containing paper separator 12 within which is disposed a mass or cake of depolarizing mix 13 having a carbon electrode 14 embedded therein and projecting upwardly above the top of the zinc cup 10. The carbon electrode 14 is of controlled porosity as is conventional in cells of this general character; the porosity is controlled to permit gases generated in the cell to escape slowly through the carbon while at the same time substantially preventing leakage of electrolyte through the carbon. The paper separator extends across the bottom of the container as at 15 and a strong bottom washer 16 composed of paraffin impregnated pasteboard or the like overlies the bottom 15. The purpose of the washer 16 is to protect the bottom paper separator 15 from possible damage by the carbon electrode 14 during the operation of assembling the cell.

The upper marginal edges of the paper separator are turned inwardly as at 18 at the top of the mix and an impervious washer 19, which is centrally apertured to receive the carbon electrode 14, is disposed over the top of the mix cake 13 and overlies the turned in edges 18. The washer 19 may be composed of paraffin impregnated pasteboard, hard fiber or the like.

In order to provide expansion space within the cell, the length of the mix cake is substantially less than the length of the zinc cup and absorbent filler members indicated somewhat diagrammatically at 20 are disposed immediately above the washer 19. These filler members may take the form of washers and are composed of any suitable absorbent material that can be compressed by the expansion of the mix cake and that will not react deleteriously with the electrolyte. Preferably, the washers are simply punched out of corrugated paper as indicated diagrammatically in the drawings.

In order to seal the cell against leakage of electrolyte and against ingress of air, a soft plastic seal 24 is poured above the absorbent filler members 20, the seal resting on the upper layer of paper 25 of the upper corrugated paper filler member. The seal is composed of a suitable pitch, wax or other similar material which has the characteristics of adhering firmly to both the zinc container 10 and the carbon electrode 14, of being pourable at a reasonable temperature and of remaining sufficiently plastic under usual temperature conditions so that it can flow gradually under the influence of pressures developed within the cell without fracturing and without having its sealing engagement with the zinc and carbon destroyed. The term "soft plastic seal" as hereinafter employed is intended to mean a seal meeting these requirements. A seal composed of an asphalt or bituminous composition and having the following characteristics as determined by standard A. S. T. M. testing procedures is satisfactory:

Softening point (A. S. T. M. test No. D–36), 173° F.
Penetration at 77° F. (A. S. T. M. test No. D–5), 29 cm.
Ductility at 77° F. (A. S. T. M. test No. D–113), 3.9 cm.
Stormer viscosity (100 grams weight, 100 R. P. M.):
    19 seconds at 350° F.
    31 seconds at 320° F.
    46 seconds at 300° F.

A material sold as "Bi-wax" No. B–1128 by the Bi-wax Corporation of Skokie, Illinois, meets these requirements. Various other materials may be employed and the characteristics set forth above can be varied within reasonable limits without greatly affecting the results.

In order to provide a closure for the top of the cell and a terminal for the carbon electrode 14, I preferably employ an imperforate metal closure disc 27 which has a raised central portion 28 that makes electrical contact with and receives the end of the carbon electrode 14. The closure disc 27 is lined with an insulating paper liner 29 disposed between the disc and the inwardly turned top 30 of the zinc can 10. The paper 29 also extends downwardly beyond the end of the depending flange 31 of the closure disc. The disc 27 and insulating paper 29 are spun or crimped inwardly as at 32 and thus secured to the container 10. The inward deformation of the closure disc 27 forms a corresponding inwardly extending groove in the zinc container 10 as shown at 33. The joint so produced is not completely impervious to the passage of gases and may or may not permit the passage of liquids. The upper end 34 of the zinc cup is reduced in diameter in the zone of the flange 31 so that the flange and the insulation do not increase the overall diameter of the cell.

In order to complete the cell and to provide a jacket of insulating material around the zinc cup 10, the cup is preferably enclosed within an absorbent paper sleeve 35, the paper preferably being impregnated with zinc oxide for reasons which will be explained below. The paper sleeve in turn is enclosed within a jacket 36 the upper and lower edges of which are flanged over as indicated at 37 and 38 to retain the jacket and the sleeve in position on the battery. The jacket may be composed of any suitable material that is impervious to the liquids in the cell. For example, the jacket may be composed of a cellulose acetate butyrate plastic or other suitable electrolyte-impervious plastic having a thickness of from about 0.010 inch to 0.012 inch, while the absorbent paper tube may be composed of chipboard having a thickness, for example, of about 0.020 inch.

In the completed battery as shown in Figure 1 the sealing material 24 blocks the direct flow of gas from the space beneath the sealing material, which contains the active materials of the battery, and the space 40 above the sealing material and beneath the cap 27. However, because the porosity of the carbon electrode 14, gas under pressure can find its way through the electrode into the space 40 as indicated by the arrows in Figure 1. This gas then can escape to the atmosphere through the joint between the cap 27 and the upper portion of the cup 10. It will be noted that the seal 24 is initially disposed slightly below the top of the cup 10 so that the sealing material does not completely seal off the joint between the cap 27 and the upper part of the cup 10.

Thus, while the cell is inactive and when the cell is first put into operation any gas generated within the cell is dissipated through the carbon electrode into the space 40, thence out through the joint between the cap 27 and the cup 10 and through the absorbent paper sleeve 25 to the exterior. This path is such, however, as to substantially prevent loss of moisture or leakage of electrolyte from the container as well as ingress of air to the interior of the cell. If any small amounts of electrolyte should be discharged through the carbon electrode and thence to the exterior of the zinc container 10, they will be absorbed by the paper sleeve 35, the plastic jacket 36 retaining small amounts of electrolyte within the sleeve 35.

So long as the cell is not in service, gas is generated so slowly, if at all, that it is dissipated without building up sufficient pressure to affect the seal 24. However, after the cell has been put in service, gas may be generated at a faster rate than it can flow through the carbon electrode 14, with the result that pressure is built up within the cell and under the seal 24 to an amount exceeding the pressure in space 40 above the seal. With the cell in service, this excess pressure within the cell acts on the under side of the soft plastic seal 24 and slowly and gradually causes the seal to rise to the position shown in Figure 3. It will be noted that the sealing material remains adherent to the carbon electrode 14 and the interior of the zinc cup 10 but is deformed and caused to flow upwardly so that the space 40 is eliminated. In its raised position the sealing material makes sealing engagement with the edge of the zinc cup in the region indicated at 41, the under side of the paper insulation 29, and the under surface of the cap 27 in the region 42 immediately adjacent the edge of the aperture of the paper insulator 29; thus the seal blocks off the zone where, in the cell as initially constructed, it was possible for gases to find their way into the minute spaces between the insulating paper 29 and the inner surface of the cap 27 and between the insulating paper 29 and the outer surface of the cup 10. By this action the original passages for the escape of gas from the cell are sealed off by the movement of the soft plastic seal 24 into the position shown in Figure 3. Also, a volume equal to the space 40 above the seal in the cell as originally constructed is formed beneath the seal 24 as indicated at 44. This space provides additional room for the usual expansion of the active materials in the cell which takes place in service. Yet, the space is provided without admitting additional air to the interior of the cell and without requiring the inclusion of greater than normal air spaces within the cell when it is originally constructed; in fact, the air space within the cell as originally constructed may be made considerably smaller than found in conventional cells, because the space is enlarged by the movement of the seal; this is advantageous because the smaller air space contains less oxygen to act on the zinc of the cell during shelf life.

As a result of the construction of the seal, cells made according to my invention have excellent shelf life and service life characteristics inasmuch as the cells contain the normal amounts of active materials, preferably have less than normal air spaces in communication with the active materials and are sealed against the admission of air. Furthermore, the cells are not subject to bulging by reason of internal pressures because the development of excessive internal pressures is prevented by the venting of gas during the shelf life and initial operation of the cell and by the provision of additional expansion space within the cell after the seal has been moved to its upper position between pressure of the gas. Cells embodying the invention are not subject to leakage and resulting damage to the devices in which the cells are used because only gas and substantially no liquid is vented from the cell during the initial period of operation and thereafter the cell is completely sealed against discharge of either liquid or gas. Furthermore, the bottom edge of the depending flange 31 of the cap lies within the sleeve 35 and is spaced from the end of the cup 10; thus any small amounts of liquid that may pass between the cap 26 and the zinc cup 10 will be discharged within and absorbed by the paper sleeve 35 and retained within the plastic jacket 36. If, in later stages of the life of the cell, the zinc container should be perforated, then the electrolyte escaping through the perforation is absorbed by the paper sleeve. As noted above, the paper sleeve is preferably impregnated with zinc oxide. Because of such impregnation, a reaction takes place between the zinc chloride in the leakage liquid and the zinc oxide which results in the formation of an insoluble zinc hydroxide in the form of a paste that is too thick to flow. The leakage liquid is thus immobilized in the paper sleeve, eliminating any possibility of leakage liquid finding its way to the ends of the sleeve beyond the plastic jacket 36.

The cell of the present invention lends itself to economical manufacturing operations and three stages in a preferred method of manufacture are illustrated in Figures 4, 5 and 6. As shown in Figure 4, zinc cup 10 is originally extruded in straight sided form. The paper separator 12, mix 13, carbon electrode 14 and washer 16 are positioned within the can as shown by conventional operations. The washer 19 is disposed above the mix cake and the absorbent filler washers 20 are placed in position as shown. Then the soft plastic seal 24 is poured while hot on top of the upper sheet 25 of the absorbent filler 20, or on top of a washer (not shown) which, if required, may be disposed above the sheet 25 to prevent undue absorption of the hot sealing material by the absorbent filler washers. The seal, however, is not poured to the top of the zinc cup but terminates at a level considerably below the upper edge of the zinc cup as shown in Figure 4.

The next operation involves the reduction in diameter of the upper portion 34 of the zinc cup and the turning inward of the edges 30 thereof. This is preferably accomplished by supporting the cell in a lower die member 46 as shown in Figure 5 and then bringing the die 47 downwardly into engagement with the upper end of the cup. The die 47 has a tapered mouth portion 48 which deflects the edge of the cup inwardly, a substantially cylindrical portion 49 and an inwardly curved portion 50 which forms the inwardly turned upper edge 30 of the cup.

The reduction in diameter of the upper portion of the cup functions to consolidate and compact the material of the seal 24 and improve the sealing engagement between the sealing material and the inner surfaces of the cup and the exterior of the carbon electrode 14. At the same time the reduction in diameter of the exterior of the cup provides room for the depending flange 31 of the cap 27 so that the external diameter of the flange 31 can be made substantially equal to the external diameter of the main body portion of the can 10. Further, the reduction in diameter raises the upper surface of the sealing material to the desired position with respect to the top of the cup.

After the upper portion of the cup is necked in as shown in Figure 5, the paper insulator 29 and cap 27 are positioned on the can as shown in Figure 6. These parts and the adjacent wall of the cup 10 are then deformed inwardly to secure the cap to the cup as indicated at 31 and 33 in Figure 1 by appropriate dies or by a spinning or rolling operation. Preferably, the cup is deformed inwardly adjacent the lower portion of the seal 24, thus further compacting the seal. The cell is completed by inserting the assembly in the paper sleeve 35, enclosing the sleeve in the impervious plastic jacket 36 and flanging over the ends of the plastic jacket and the adjacent portions of the paper sleeve as indicated at 37 and 38 in Figure 1.

From the foregoing description of a preferred form of my invention it will be evident that I have provided a dry cell battery which is substantially free from the difficulties encountered in ordinary dry cells by reason of leakage of electrolyte therefrom or bulging of the cells because of excessive pressures within the cell. These results are accomplished primarily by the construction in which the seal is arranged to permit pressure of gas developed within the cell during its initial stages of operation to be dissipated to the exterior of the cell and in which the seal moves during the operation of the cell to a position in which it hermetically seals the cell, the movement of the seal to its new position providing additional room within the cell for expansion of components of the cell. Furthermore, the cell is designed so that it can be manufactured economically and rapidly according to the preferred method disclosed herein.

Those skilled in the art will appreciate that various changes can be made in the cell and method described herein and that the invention can be adapted to cells and batteries of different types without departing from the spirit and the scope of the invention. It is therefore to be understood that the description of the preferred form of the invention contained herein is given by way of example and not by way of limitation. The scope of the invention is defined by the appended claims.

I claim:

1. A dry cell comprising a zinc cup electrode, electrolyte-containing elements and a porous carbon electrode disposed within the zinc cup, and means for sealing the cell comprising an impervious terminal and closure cap overlying said carbon electrode and secured to the upper edge of said zinc cup, the joint between said cap and said cup being pervious to gas, a gas-impervious soft plastic seal disposed above the electrolyte-containing elements of said cell and initially spaced from said cap and from the joint between said cap and said cup, said carbon electrode extending through said soft plastic seal whereby gas generated within said cell may initially pass through said carbon electrode into the space between said cap and seal and thence escape through the joint between said cap and said cup, said seal being displaceable by pressure of gas within said cell and movable by such pressure to a position in which it seals the joint between said cap and said cup.

2. In an electrolytic device, an open-ended metal container, electrolyte-containing elements disposed within the container, and means for sealing the container comprising an impervious closure cap secured to the container adjacent the open end thereof, the joint between said cap and said container being pervious to gas, a gas-impervious soft plastic seal disposed above said electrolyte-containing elements and initially spaced from the joint between said container and said cap whereby gas generated within said container may initially escape through said joint, said seal being displaceable by pressure of gas within said container and movable by such pressure to a position in which it seals said joint.

3. A dry cell comprising a zinc cup electrode, electrolyte-containing elements and a porous carbon electrode disposed within the zinc cup, and means for sealing the cell comprising an impervious terminal and closure cap overlying said carbon electrode and secured to the upper edge of said zinc cup, the joint between said cap and said cup being pervious to gas, a gas-impervious soft plastic seal disposed above and spaced from the electrolyte-containing elements of said cell to provide expansion space within the cell and initially spaced from the joint between said cap and said cup whereby gas generated within said cell may initially escape through the joint between said cap and said cup, said seal being displaceable by pressure of gas within said cell and movable bodily by such pressure to a position in which it seals the joint between said cap and said cup, the expansion space within the cell being increased by such movement.

4. A dry cell comprising a zinc cup electrode, electrolyte-containing elements and a centrally disposed porous carbon electrode disposed with the zinc cup, and means for sealing the cell comprising a metal terminal and closure cap engaging and overlying said carbon electrode and secured to the upper edge of said zinc cup, a sheet of insulating material interposed between said metal terminal member, the connection between said cap and said cup being pervious to gas, a gas-impervious soft plastic seal disposed above the electrolyte-containing elements of said cell, said seal adhering to said zinc cup and to said carbon electrode and being initially spaced beneath said cap whereby a path for the escape of gas generated within said cell is initially provided through said porous carbon electrode to the space beneath said cap and above said seal and thence through the connection between said cap and said cup, said seal being displaceable between pressure of gas within said cell and movable bodily by such pressure to a position in which it seals the connection between said cap and said cup.

5. A dry cell comprising a zinc cup electrode, electrolyte-containing elements and a centrally disposed porous carbon electrode disposed with the zinc cup, and means for sealing the cell comprising a metal terminal and closure cap engaging and overlying said carbon electrode and having a depending flange extending over the exterior of the end portion of said zinc cup, a sheet of insulating material interposed between said metal terminal member, the diameter of the cup being reduced in the region of said flange and said flange being deformed inwardly to secure said cap to said cup, the connection between said cap and said cup being pervious to gas, a soft plastic seal disposed above the electrolyte-containing elements of said cell and within the portion of the cup of reduced diameter, said seal adhering to said zinc cup and to said carbon electrode and being initially spaced beneath said cap whereby a path for the escape of gas generated within said cell is initially provided through said porous carbon electrode to the space beneath said cap and above said seal and thence through the connection between said cap and said cup, said seal being displaceable between pressure of gas within said cell and movable bodily by such pressure to a position in which it seals the connection between said cap and said cup.

6. A dry cell comprising a zinc cup electrode, electrolyte-containing elements and a centrally disposed porous carbon electrode disposed with the zinc cup, and means for sealing the cell comprising a metal terminal and closure cap engaging and overlying said carbon electrode and having a flange extending over the exterior of said zinc cup and secured to said zinc cup, a sheet of insulating material interposed between said metal terminal member and said cup, the connection between said cap and said cup being pervious to gas, a soft pitch seal disposed above the electrolyte-containing elements of said cell, said seal adhering to said zinc cup and to said carbon electrode, and being initially spaced beneath said cap whereby a path for the escape of gas generated within said cell is initially provided through said porous carbon electrode to the space beneath said cap and above said seal and thence through the connection between said cap and said cup, said seal being displaceable by pressure of gas within said cell and movable bodily by such pressure to a position in which it seals the connection between said cap and said cup, an absorbent paper sleeve surrounding said cup and said flange and an electrolyte impervious plastic jacket surrounding said absorbent paper sleeve.

7. A dry cell comprising a zinc cup electrode, electrolyte-containing elements and a centrally disposed porous carbon electrode disposed with the zinc cup, and means for sealing the cell comprising a metal terminal and closure cap engaging and overlying said carbon electrode and having a flange extending over the exterior of said zinc cup and secured to said zinc cup, a sheet of insulating material interposed between said metal terminal member and said cup, the connection between said cap and said cup being pervious to gas, a soft pitch seal disposed above the electrolyte-containing elements of said cell, said seal adhering to said zinc cup and to said carbon electrode, and being initially spaced beneath said cap whereby a path for the escape of gas generated within said cell is initially provided through said porous carbon electrode to the space beneath said cap and above said seal and thence through the connection between said cap and said cup, said seal being displaceable by pressure of gas within said cell and movable bodily by such pressure to a position in which it seals the connection between said cap and said cup, an absorbent paper sleeve impregnated with zince oxide surrounding said cup and said flange and an electrolyte impervious plastic jacket surrounding said absorbent paper sleeve.

8. A dry cell comprising an open ended zinc cup electrode, electrolyte-containing elements within the zinc cup, spacer means disposed above the electrolyte-containing elements to provide expansion space within the cup and a seal member disposed within the open end of the cup above the spacer means, said seal member being positioned below the top of the zinc cup and being displaceable by pressure within the cell and movable bodily by such pressure to a position in which the expansion space within the cell is increased.

9. An electrolytic device comprising an open ended container, electrolyte-containing elements within the container, spacer means disposed above the electrolyte-containing elements to provide expansion spaces within the container and a seal member disposed within the open end of the container above the spacer means, said seal member being positioned below the top of the container and being displaceable by pressure within the container and movable bodily by such pressure to a position in which the expansion space within the container is increased.

10. A dry cell according to claim 9 wherein the side wall of the container is surrounded by an absorbent sleeve impregnated with zinc oxide.

11. A dry cell according to claim 10 wherein the absorbent sleeve is surrounded by a jacket of electrolyte impervious material.

12. A dry cell comprising a zinc cup electrode, electrolyte-containing elements and a central carbon electrode within the zinc cup, an absorbent spacer disposed above the electrolyte-containing elements to provide expansion space within said zinc cup and a soft plastic seal disposed above the absorbent spacer, said seal engaging the zinc cup and carbon electrode and being positioned below the top of the zinc cup, said seal being displaceable by pressure of gas within the cell and movable bodily by such pressure to a position in which the expansion space within the cell is increased.

13. A dry cell comprising a zinc cup electrode, electrolyte-containing elements and a central carbon electrode within the zinc cup, an absorbent spacer disposed above the electrolyte-containing elements to provide expansion space within said zinc cup and a soft plastic seal disposed above the absorbent spacer, said seal engaging the zinc cup and carbon electrode and being positioned below the top of the zinc cup, said zinc cup being reduced in diameter in the region of the seal and said seal being displaceable by pressure of gas within the cell and movable bodily by such pressure to a position in which the expansion space within the cell is increased.

References Cited in the file of this patent

UNITED STATES PATENTS

| Number | Name | Date |
|---|---|---|
| 439,151 | Hellesen | Oct. 28, 1890 |
| 1,196,611 | Tassin | Aug. 29, 1916 |
| 1,925,374 | Deibel | Sept. 5, 1933 |
| 2,015,379 | Deibel | Sept. 24, 1935 |
| 2,026,615 | Corigliano et al. | Jan. 7, 1936 |
| 2,169,702 | Marsal | Aug. 15, 1939 |
| 2,244,016 | Marsal | June 3, 1941 |
| 2,262,836 | Deibel | Nov. 18, 1941 |
| 2,289,249 | Deibel | July 7, 1942 |
| 2,307,763 | Deibel | Jan. 12, 1943 |
| 2,332,456 | McEachron et al. | Oct. 19, 1943 |
| 2,396,693 | Glover | Mar. 19, 1946 |
| 2,399,089 | Anthony | Apr. 23, 1946 |
| 2,410,826 | Lang et al. | Nov. 12, 1946 |
| 2,542,934 | MacFarland | Feb. 20, 1951 |
| 2,606,942 | Bonin | Aug. 12, 1952 |